United States Patent [19]
Snodgrass et al.

[11] Patent Number: 6,105,829
[45] Date of Patent: *Aug. 22, 2000

[54] FLUID DISPENSING SYSTEM

[75] Inventors: Ocie T. Snodgrass, Garland; Michael K. Farney, Irving; Gregory M. Gibson, Dallas, all of Tex.

[73] Assignee: Millipore Investment Holdings, Ltd., Wilmington, Del.

[*] Notice: This patent is subject to a terminal disclaimer.

[21] Appl. No.: 09/106,586

[22] Filed: Jun. 29, 1998

Related U.S. Application Data

[63] Continuation of application No. 08/605,878, Feb. 23, 1996, Pat. No. 5,772,899, which is a continuation of application No. 08/107,866, Aug. 18, 1993, Pat. No. 5,516,429, which is a continuation of application No. 07/747,884, Aug. 20, 1991, abandoned, which is a continuation of application No. 07/329,525, Mar. 28, 1989, Pat. No. 5,167,837.

[51] Int. Cl.[7] .................................. B67D 5/08; B67D 5/46
[52] U.S. Cl. .......................... 222/214; 222/255; 222/263; 417/244; 417/253; 417/395; 417/426

[58] Field of Search .................................. 210/143, 257.1, 210/257.2, 258, 416.1, 416.4, 416.5, 767; 417/2, 205, 244, 245, 246, 313, 383, 395, 413.1, 413.2, 413.3, 426, 540, 253, 254, 393, 428; 222/1, 252, 253, 255, 541.1, 214, 263

[56] References Cited

U.S. PATENT DOCUMENTS

| | | | |
|---|---|---|---|
| 4,003,679 | 1/1977 | McManigill et al. | 417/246 |
| 4,599,049 | 7/1986 | Gordon et al. | 417/205 |
| 5,167,837 | 12/1992 | Snodgrass et al. | 210/767 |
| 5,772,899 | 6/1998 | Snodgrass et al. | 210/767 |

*Primary Examiner*—Joseph W. Drodge
*Attorney, Agent, or Firm*—J. Mark Holland

[57] ABSTRACT

A fluid dispensing system is provided which has a first diaphragm pump, a filter connected to receive the discharge of said first pump, and a accumulator/second diaphragm pump connected to receive the discharge of said filter. Hydraulic fluids pumped by cylinder/piston/stepper assemblies independently actuate each of the diaphragm pumps, providing accurate, controllable and repeatable dispense of the subject fluid.

9 Claims, 2 Drawing Sheets

1

FLUID DISPENSING SYSTEM

This is a continuation of application Ser. No. 08/605,878, filed Feb. 23, 1996, now U.S. Pat. No. 5,772,899, which is a continuation of application Ser. No. 08/107,866, filed on Aug. 18, 1993, now U.S. Pat. No. 5,516,429, which is a continuation of application Ser. No. 07/747,884, filed on Aug. 20, 1991, now abandoned, which is a continuation of application Ser. No. 07/329,525, filed Mar. 28, 1989, now U.S. Pat. No. 5,167,837.

BACKGROUND OF THE INVENTION

This invention relates to a pumping system useful in dispensing fluids, especially those which are expensive, viscous, high purity, and/or sensitive to molecular shear.

The invention has numerous applications, but is especially useful in the microelectronics industry. The trend in that industry is to squeeze greater quantities of circuitry onto smaller substrates. Circuit geometries have been shrunk to less than one micron. In that microscopic world, the slightest particle of contamination can create a defect, decreasing production yields, degrading device performance, and reducing device reliability.

For this and other reasons, modern manufacturing techniques in the microelectronics and other industries sometimes involve decontaminated "cleanroom" environments. Many of these techniques also use advanced process chemicals, some of which are very expensive. For example, certain chemicals used to process semiconductors can cost $15,000 or more per gallon, and the semiconductor substrates can be worth $20,000 or more at that stage of processing. To be useful in cleanroom environments and applications, however, the chemicals must be filtered. Because of the viscosities and sensitivities of the fluids, they must be filtered at low flow rates and under low pressure to minimize molecular shear on the fluids. Prior art devices do not meet these parameters in certain production-line operations.

For example, some operations require a periodic, non-continuous "shot" of fluid. Such "shots" sometimes consume only a small part of the pump's cycle time, leaving the pump and/or filter idle during the remainder of the cycle. During that relatively brief moment when a shot occurs, high pressure must be used to achieve a flow rate sufficient to dispense an appropriate amount of fluid. As noted above, such high pressures and flow rates can damage sensitive fluids.

In addition, low pressure filtration is generally recognized as the best way to effectively eliminate gel slugs in, and remove contaminants from, a subject fluid. If high pressure is used to achieve a desired flow rate through a filter, contaminants can be forced through the filter, rather than retained therein.

Furthermore, many operations, especially in the semiconductor industry, apply only small amounts of fluid to each unit processed. In these applications, there is an increased need for precise control over the dispense.

Additionally, the reservoir of subject fluid needs to be easily monitored, replaced, and/or replenished. These dispense systems also need to be easily primed with and purged of subject fluid, to allow the system to be used on more than one fluid, and to reduce fluid shear.

At the present time there is no system that satisfactorily meets these various requirements. In fact, in some research laboratories, these expensive fluids are still being dispensed by hand; that is, lab technicians or scientists pour the fluids directly out of storage containers. This hand pouring has poor repeatability, involves significant operator technique, does not allow point-of use filtration, and generally causes a tremendous, expensive waste of time and materials. Production and laboratory costs could be greatly reduced by automating the dispense of these fluids.

Numerous other problems exist with prior art dispense systems. In certain operations where relatively high pressure is acceptable and desired to achieve a necessary flow rate, such as through a filter which is still useful even though partially clogged, prior art systems cannot deliver, or are inaccurate when delivering, the required pressure. The systems have poor predictability and repeatability of results. Their complicated flowpaths are difficult to purge, and excessive fluid hold-up volumes lead to fluid waste.

Prior art systems also waste fluid during dispensing and provide little, if any, in the way of "suck-back" adjustment. Suck-back is an adjustment made at the outlet port of a given dispense system, in which the fluid is drawn back slightly inside the port. This adjustment reduces fluid solvent evaporation at the outlet during idle periods, reduces fluid contamination at the outlet, and most importantly allows for a sharp and dripless cessation of dispense, avoiding waste of the processed fluid.

Additionally, prior art systems are not easily automated, their fluid reservoir levels cannot be easily monitored, and they are limited in the range of fluid viscosities which they can dispense. Finally, complex mechanisms downstream of the filter often generate fluid contaminants.

For example, certain prior art systems utilize diaphragm-type pumps in which the diaphragm is actuated by air pressure. Typically, the actuating air is more compressible than the liquids being pumped. As air pressure is increased in an attempt to displace the diaphragm and dispense fluid, the actuating air is compressed, in effect "absorbing" part of the intended displacement of the diaphragm. This air compression prevents accurate control and monitoring of the position of the diaphragm and, correspondingly, prevents accurate control and monitoring of the volume and rate of fluid dispensed.

The problem is exacerbated if the fluid is being pumped through a filter. By its nature, the filter becomes clogged during use. As it becomes clogged, higher pressure is required to achieve a given flow rate through the filter. Because the air pressure actuating the diaphragm typically remains relatively constant throughout the life of the filter, however, fluid flow rate through the filter decreases as the filter becomes more clogged, making it even more difficult to achieve repeatable, accurate dispense.

OBJECTS AND ADVANTAGES OF THE INVENTION

It is, therefore, an object of our invention to provide a fluid dispensing system which can accurately and repeatedly dispense without contaminating a subject fluid.

Another object of our invention is to provide a fluid dispensing system which can be utilized in filtering viscous and other fluids under relatively low pressure, decreasing molecular shear on the fluids. A preferred embodiment of the invention allows the fluid to be filtered continuously (and thus at a relatively low pressure and flow rate) with one pump, while being dispensed non-continuously with a second pump.

It should be understood that, while the invention is described herein in connection with dispense of high-purity, viscous fluids, the invention may be utilized in many other applications. Moreover, although the preferred embodiment discussed herein includes two pumping means with filter means interposed therebetween, advantageous aspects of the invention may be practiced with no filter means, or with only one pumping means with or without filter means.

Another object of our invention is the provision of a dispensing system permitting the use of computer or other automated control for the rate and interval of dispense, as well as for the direction of fluid flow through the system and fluid pressure during operation of the system.

Still another object of our invention is the provision of a dispensing system which permits great flexibility of operation, making it adaptable to numerous applications.

An additional object of our invention is to provide a pumping system which can be easily purged of a processed fluid.

Yet another object of our invention is to provide a fluid filtering system with no contamination-generating components downstream from the filter.

Still another object of our invention is to provide a pumping system which can dispense fluids at controlled flow rates without being affected by the condition of a filter within the system, even if relatively high pressure is required to achieve the flow rates.

An additional object of our invention is to provide a pumping system which can accurately provide and control suck-back of process fluid, and can be primed and/or recharged with minimal waste, stress, shear or introduction of gasses into the process fluid.

Another object of our invention is to provide a pumping system in which the fluid input reservoir may be replenished or otherwise adjusted without interrupting the dispense operation of the system, and in which the reservoir fluid input level can be easily monitored.

Other objects and advantages of the invention will be apparent from the following specification and the accompanying drawings.

DESCRIPTION OF PREFERRED EMBODIMENTS OF THE INVENTION

Figure 1:
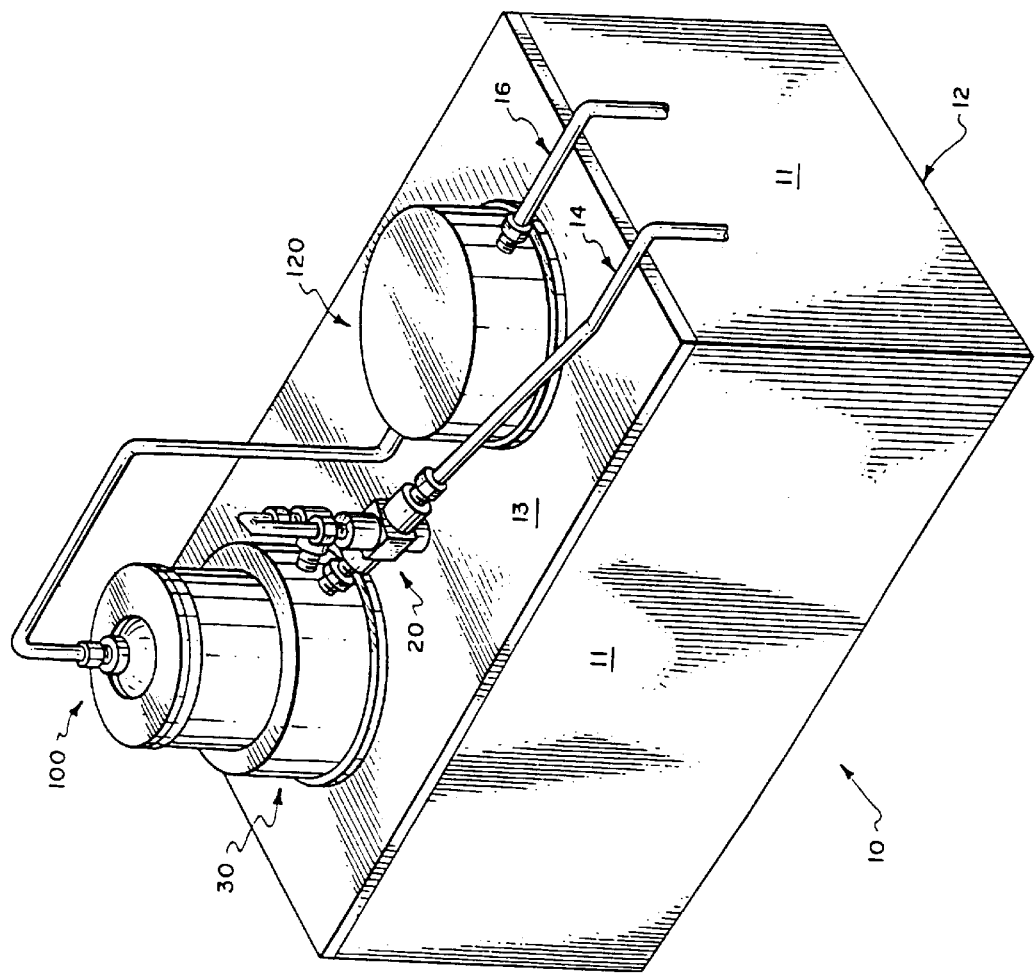
FIG. 1 is an isometric view of a dispensing system constructed in accordance with the teachings of the invention.

Referring to the drawings, and particularly to FIG. 1 thereof, we show a preferred embodiment of a dispense system 10 constructed in accordance with the teachings of the invention. In broad terms, a subject fluid (the fluid to be dispensed) enters system 10 from a reservoir through tubing 14, travels through valve means 20 to first pumping means 30, returns through valve means 20 to filter means 100, travels through second pumping means 120, and is dispensed through tubing 16. A more detailed explanation of its operation is set forth below.

A housing 12, FIG. 1, has sides 11 and a mounting plate 13 forming the top thereof. The sides 11 and mounting plate 13, as well as many of the other components of the preferred embodiment, are typically constructed of stainless steel in order to be compatible with laboratory and cleanroom environments and with the subject fluids.

Figure 2:
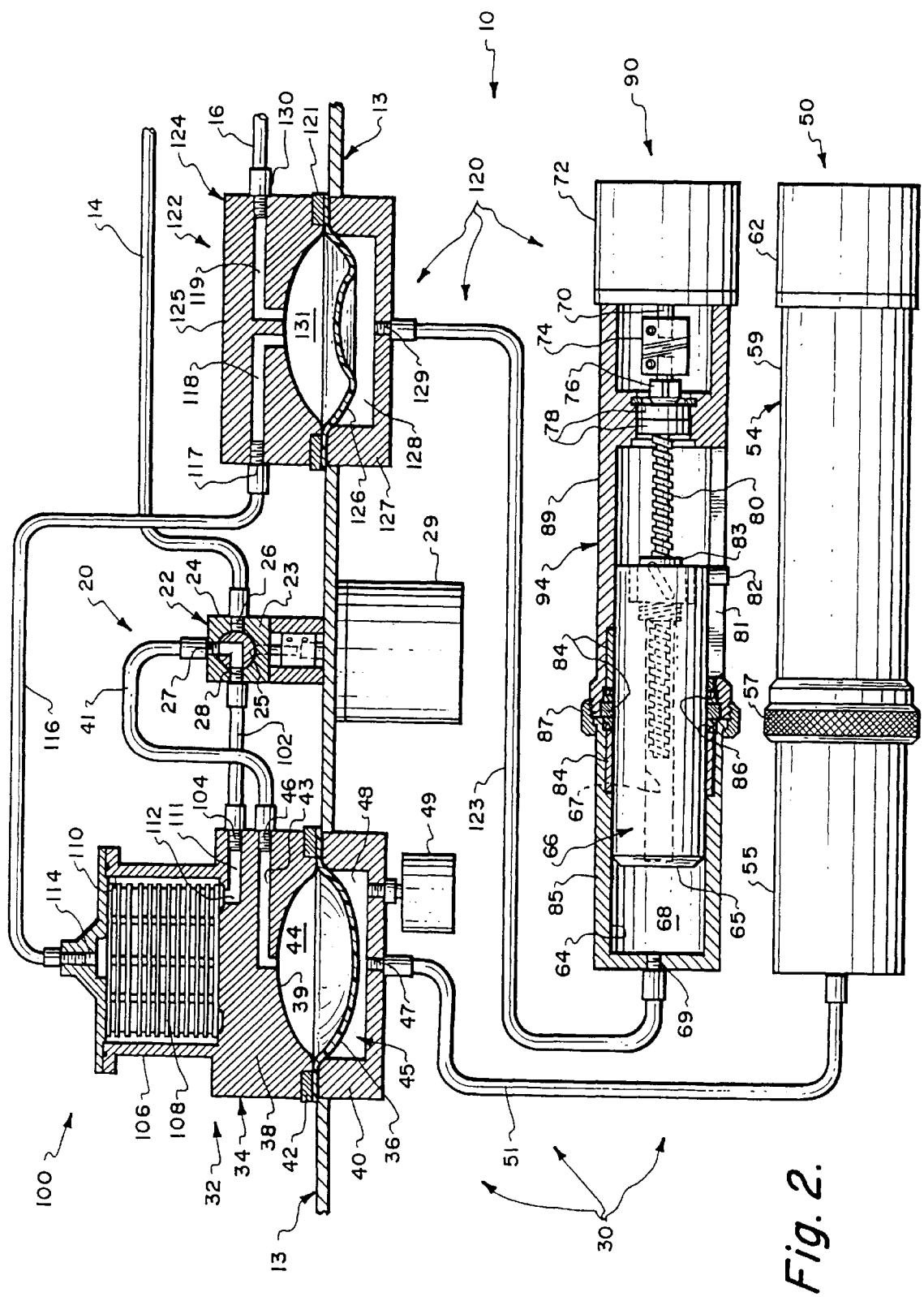
FIG. 2 is a schematic, partially sectional side elevation view of a preferred embodiment of the invention.

Valve means 20, FIG. 2, is incorporated in a valve member 22, exemplified as a ball valve 24 mounted on plate 13. Ball valve 24 includes valve body 23 with ball element 25 and ports 26, 27, and 28 therein. Ball element 25 can be selectively rotated to permit fluid communication either between ports 26 and 27 or ports 27 and 28. This selective rotation can be accomplished by various means, including valve actuating means 29. In the preferred embodiment, actuating means 29 is an electronic valve drive motor which permits remote and/or computer-controlled actuation of ball valve 24.

First pumping means 30 includes a first pumping member 32, constituting master diaphragm pump 34 mounted on plate 13, first incremental pump means 50, and tubing 51 therebetween. Pump 34 includes upper housing 38 machined from stainless steel, lower housing 40 machined from aluminum, and teflon\ diaphragm 36 disposed therebetween. Those skilled in the art will understand that materials other than stainless steel, aluminum and teflon\ may be used in the practice of the invention. Diaphragm 36 is retained in sealing engagement between upper and lower housings 38 and 40 at least in part by sealing ring 42, which is disposed between housings 38 and 40 at their mutual peripheries.

Housings 38 and 40 are so machined that, when assembled with diaphragm 36 and sealing ring 42, a pumping chamber 45 is formed between said housings, said chamber being divided by diaphragm 36 into an upper compartment 44 and a lower compartment 48. Upper compartment 44 is defined by diaphragm 36 and internal surface 39 of upper housing 38. Internal surface 39 is shaped so that diaphragm 36 can, when sufficiently deflected, conform thereto. When so deflected, the capacity of compartment 44 is nil, all fluid having been purged therefrom.

Passage 43 is machined in upper housing 38 to establish fluid communication between port 46 and upper compartment 44. Port 46 is connected by tubing 41 to port 27 of ball valve 24, permitting fluid flow between valve means 20 and first pumping means 30. Port 47, with tubing 51 connected thereto, is provided in lower housing 40 to permit external fluid communication with lower compartment 48.

In the preferred embodiment, pumping means 30 includes a pressure sensor 49 in fluid communication with lower compartment 48 to monitor the pressure therein. Sensor 49, the function of which is more fully explained below, can be connected to a computer or other automatic control to assist in operation of dispense system 10. In an alternative embodiment, a second pressure sensor may be similarly positioned and employed on the second pumping means 120.

Lower compartment 48 is filled with a relatively incompressible fluid such as hydraulic coupling fluid, which communicates through port 47 and tubing 51 with first incremental pump advancement means 50.

Incremental pump advancement means 50, FIG. 2, incorporates a hydraulic stepper assembly 54, comprising housing components 55 and 59 connected by cylindrical coupling 57, and electronic stepper motor 62 connected to component 59. In the preferred embodiment, the structure and operation of advancement means 50 is identical to the structure and operation of second incremental advancement means 90, shown as hydraulic stepper assembly 94. The internal structure and the function of incremental advancement means 50 can be conveniently illustrated, therefore, by reference to stepper assembly 94, shown in FIG. 2 in partial sectional view.

Stepper assembly 94 includes components 85 and 89, corresponding to components 55 and 59 of advancement means 50. Components 85 and 89 are releasably connected by cylindrical coupling 87 to form cylinder 64. Piston 66 is machined from hard chrome-plated stainless steel and is slidably disposed in cylinder 64, reciprocating therein in response to rotation of lead screw linear drive 80. A bore 67 is axially disposed in the piston 66 to receive the drive 80. A ball nut 83 is operably attached to piston 66 at the mouth of the bore 67, and the drive 80 is threadedly engaged with the ball nut 83 to cause the aforesaid reciprocation of piston 66 in cylinder 64. Drive 80 is actuated by electronic stepper motor 72, through its output shaft 70, flexible shaft coupling 74, bearing pre-load nut 76, and dual thrust bearings 78. Shaft 70, coupling 74, nut 76, bearings 78, drive 80, ball nut 83, and piston 66 are all assembled to translate the rotational movement of output shaft 70 into linear movement of piston 66.

Piston anti-rotation bearing 82 is fixedly connected to piston 66 and slidably disposed in slot 81, to prevent rotation of piston 66 in cylinder 64. As piston 66 reciprocates in cylinder 64, bearing 82 correspondingly reciprocates in slot 81, which is axially oriented in one side of housing component 89. Energized teflon scraper seals 86 and bronze piston guides 84 are located adjacent the juncture of housing components 85 and 89. Seals 86 and guides 84 are retained in annular grooves in the wall of cylinder 64, to prevent fluid leakage from cylinder 64 and to guide piston 66 in cylinder 64.

Electronic stepper motor 72 may be controlled by a computer or some other form of automatic control, and may be selectively operated to cause right-hand or left-hand rotation of shaft 70. As indicated above, this rotation causes corresponding linear movement of piston 66 in cylinder 64. Motor 72 is operable in finite, repeatable and controllable increments and rates, allowing corresponding control of the movement of piston 66.

Piston 66 has an end 65 which, together with cylinder 64, defines chamber 68. Chamber 68 is filled with a relatively incompressible fluid such as hydraulic coupling fluid. Housing component 85 includes port 69 which provides fluid communication between chamber 68 and tubing 123.

Second pumping means 120 is shown in FIG. 2 as pump member 122, constituting slave diaphragm pump 124, and second incremental pump advancement means 90 connected by tubing 123 to pump 124. Slave pump 124 includes upper and lower housing components 125 and 127, diaphragm 126, and sealing ring 121, which correspond respectively to housing components 38 and 40, diaphragm 36, and ring 42 of master pump 34. Slave pump 124 also includes lower compartment 128 and upper compartment 131, similar to compartments 48 and 44, respectively, of master diaphragm pump 34.

Port 129 is machined in lower housing 127, and tubing 123 is connected thereto, to provide fluid communication between lower compartment 128 and port 69 of chamber 68. Compartment 128, tubing 123, and chamber 68 are filled with a relatively incompressible fluid such as hydraulic coupling fluid. Similarly, their corresponding components in first advancement means 50 and first diaphragm pump 34 are filled with hydraulic coupling fluid.

Because diaphragm 36 of first pump member 32 is actuated in a similar manner to the actuation of diaphragm 126 in second pump member 122, a discussion of the latter is illustrative of both. As piston 66 is reciprocated in cylinder 64, coupling fluid is selectively either forced from chamber 68 through tubing 123 to compartment 128, or withdrawn in the opposite direction by relative negative pressure (a partial vacuum) in chamber 68. These alternative fluid conditions, in turn cause corresponding alternative deflection of diaphragm 126. This displacement of diaphragm 126 is volumetrically equivalent to the displacement of piston 66.

Movement of diaphragm 126 can be accurately controlled because the above-discussed precise movements of piston 66 are transmitted to diaphragm 126 with relatively no distortion through the hydraulic fluid medium. As noted above, movements of diaphragm 126 are relatively accurate and repeatable in comparison to prior art dispense pump systems which use, for example, compressible fluids such as air to deflect diaphragm 126.

Diaphragm pump 34 can be primed with subject fluid by rotating ball element 25 to place port 27 in fluid communication with port 28, as shown in FIG. 2. Stepper assembly 50 is operated to deflect diaphragm 36 to minimize the capacity of compartment 44. Next, ball element 25 is rotated so that port 27 communicates with port 26. Advancement means 50 is then operated to deflect diaphragm 36 to maximize the capacity of compartment 44, creating relative negative pressure therein, as compared to atmospheric. This relative negative pressure pulls fluid from a reservoir through tubing 14, ball valve 24, and tubing 41 into compartment 44. The process is continued until all air is purged from compartment 44, tubing 14, and tubing 41.

During both the initial priming operation of the system and the subsequent stages of processing in which the compartment 44 is recharged with the subject fluid, the rate of deflection of diaphragm 36 is closely controlled to limit the amount of relative negative pressure created in compartment 44. The pressure is monitored by pressure sensor 49, and the operation of advancement means 50 is adjusted accordingly. This close control is necessary to prevent "outgassing" in the subject fluid. If the negative pressure becomes excessive, undesirable gas pockets may form in the subject fluid.

In the preferred embodiment, the maximum capacity of compartment 44 is greater than the combined capacities of passage 43, tubing 41, and tubing 14, which enhances purging and priming operations of system 10. Also, pressure sensor 49 can be used to monitor the relative negative pressure to prevent outgassing in the subject fluid when the fluid is being drawn into compartment 44.

Filter means 100 is shown in FIG. 2 as filter member 106, constituted by teflon\ fluid filter element 108 removably located in chamber 110 formed in upper housing component 38. Chamber 110 has two ports, inlet port 112 and outlet port 114, positioned on opposite extremities of filter element 108. Passage 111 is machined in housing 38 to provide fluid communication between port 112 and port 104. Tubing 102 connects ports 104 and 28.

After master pump 34 has been primed with subject fluid, ball element 25 is rotated to place ports 27 and 28 in fluid communication with one another. In the preferred embodiment, pump 34 can then pump fluid to filter means 100 through port 28, tubing 102, port 104, passage 111 and port 112. The pumped fluid then travels through filter element 108 in chamber 110, and out of chamber 110 through outlet port 114.

Those skilled in the art will understand that alternative embodiments of the invention would include filter means 100 remote from upper housing 38, as well as no filter element at all.

After exiting chamber 110 through port 114, the subject fluid flows through tubing 116 to port 117 of slave diaphragm pump 124. As indicated above, the basic structure and function of slave diaphragm pump 124 are identical to master diaphragm pump 34. At least one important distinction exists, however, in that upper housing component 125 of second pump 124 has separate inlet and outlet passages 118 and 119 providing fluid access to compartment 131. Passages 118 and 119 are machined in housing component 125 to provide fluid communication between upper compartment 131 and ports 117 and 130 respectively. Outlet tubing 16 is connected to port 130.

The subject fluid enters upper compartment 131 through port 117 and passage 118, and can be selectively: (1) accumulated in upper compartment 131 for subsequent dispense; (2) dispensed immediately through passage 119 and port 130 to tubing 16; or (3) partially accumulated and partially dispensed. This flexibility of operation inheres in master pump's 34 use as a filtration pump independently from slave pump's 124 use as a fluid accumulator/dispense pump. The selected operation of system 10 is achieved through coordinated control of diaphragms 126 and 36 by advancement means 90 and 50, respectively.

To accumulate filtered fluid in slave pump 124, diaphragm 126 is drawn down at a rate at least as great as the rate at which fluid is being pumped through passage 118 by master pump 34.

The capacities of upper compartments 131 and 44 of their respective diaphragm pumps 124 and 34 are approximately equivalent, and are typically greater than the volume of subject fluid required during any single dispense, for applications involving periodic dispense of fluid. For this reason, master pump 34 can be utilized to draw and filter the subject fluid independently of whether fluid is being dispensed from system 10. Compartment 131 can, in effect, serve as a storage chamber for filtered fluid.

This means that subject fluid may be filtered at a slower rate (thereby reducing molecular shear on the fluid) than might be required in, for example, a "shot" type of periodic dispense. By way of illustration, if a production line cycle requires two seconds of dispense followed by three seconds of non-dispense, system 10 allows each volume of fluid to be filtered over a span of five seconds. During the three seconds of non-dispense, fluid is accumulated in slave pump 124. In contrast, if fluid were to be dispensed directly from filter means 100, only two seconds would be available to filter the same volume of fluid, necessitating an increase in flow rate of, and pressure on, the fluid. In short, first pumping means 30 can pump fluid through filter means 100 at a rate and for an interval completely independent of the rate and interval at which the subject fluid is dispensed from the second pumping means 120.

Dispense of the subject fluid can be controlled solely by actuation of diaphragm 126, after sufficient subject fluid has been filtered and accumulated in compartment 131. To do so, ball valve 24 is actuated to allow communication between inlet port 26 and port 27, effectively blocking flow through tubing 102. With the ball valve 24 in this position, second pumping means 120 can selectively dispense fluid through passage 119. Even if ports 27 and 28 are in communication with each other, fluid will not flow back through tubing 102 if pumping means 30 remains static. Additionally, pumping means 120 can "suck-back" the fluid from outlet tubing 16 through port 130. Advancement means 90 is operated to "pull down" diaphragm 126, enlarging compartment 131 and creating a relative negative pressure therein. As noted above, this "suck-back" process provides many benefits, including preventing wastage of material, preventing unnecessary contamination of the fluid, and improving the accuracy of the dispense of the fluid. If diaphragm 126 is pulled down at a sufficiently high rate, suck-back can be achieved even while fluid is being filtered and pumped into compartment 131. Furthermore, while valve 24 connects ports 26 and 27, the fluid reservoir connected to tubing 14 can be replaced or otherwise altered without affecting or interrupting the dispense of fluid from outlet port 130.

Filter element 108 and the various ports and tubing throughout system 10 are selected and sized based on, among other factors, the viscosities, allowable molecular shear, and desired flow rates of the subject fluids. Those skilled in the art will understand that a given filter element 108 and tubing and port sizing will perform satisfactorily for a range of fluid viscosities and flow rates.

As system 10 is used, particle contaminants in the subject fluid are collected in filter element 108, gradually blocking the flow of subject fluid. As this blockage increases, fluid flow rate through filter element 108 will decrease unless the pressure differential across filter element 108 is increased.

In some prior art systems, the pressure differential across the filter is limited by the pressure available to actuate the diaphragm pump. In the preferred embodiment, however, because relatively incompressible fluid is used in lower compartment 48 and throughout the relevant ports, tubing and advancement means 50, there is no corresponding limitation on differential pressure applied across filter element 108. Assuming that the subject fluid is also relatively incompressible, flow rate across filter element 108 is controlled by the movement of piston 66 in advancement means 50. In effect, a given volumetric displacement of piston 66 results in an equivalent volumetric displacement of diaphragm 36. Although incoming fluid pressure may increase as filter element 108 becomes blocked through use, the rate and amount of fluid flow are unaffected by such blockage; that is, an incremental rate or amount of movement of piston 66 will result in a corresponding rate and amount of fluid flow through filter element 108.

Those skilled in the art will understand that the invention can also be practiced where a single chamber houses both diaphragm 36 and piston 66 of advancement means 50, eliminating the intervening ports and tubing 51.

As indicated above, increased pressure may be necessary to achieve a given flow rate as filter element 108 becomes clogged. Pressure sensor 49 allows any such increases in pressure to be monitored, and also thereby indirectly indicates the amount of blockage in filter element 108. Pressure levels can be determined which will indicate when filter element 108 needs to be replaced, as well as when maximum allowable shear on the subject fluid is being approached.

As further indicated above, pressure sensor 49, actuating means 29, and advancement means 50 and 90 can all be connected to an automated control (such as a computer), permitting automatic, repeatable, precise operation of system 10. The precision and flexibility of such a control arrangement far surpasses anything available in the prior art. Such a computer-controlled arrangement also allows computer monitoring of the volume of fluid dispensed by system 10, as well as volume drawn in from the fluid reservoir. For example, the relative movements of electronic stepper motor 62 can be monitored by computer. As noted above, those movements correspond to the volume of subject fluid being pumped from upper compartment 44 of master diaphragm pump 34. If the volume of fluid in the reservoir is known and input into the computer, the computer can also indicate when the reservoir is nearing depletion.

Those skilled in the art will understand that certain principles of the invention may be practiced without any second pumping means 120, in which case fluid would be dispensed from tubing 116. This arrangement is useful where fluid viscosity is relatively low, blockage of filter element 108 requires a relatively long period of time, and dispense of the fluid is to be non-continuous; that is, where the desired dispense can be achieved without accumulating the fluid in a post-filtering chamber such as chamber 131.

Similarly, those skilled in the art will understand that certain principles of the invention may be practiced without any filter means 100 between first pumping means 30 and second pumping means 120. In such situations, port 28 of ball valve 24 could be connected by tubing to port 117 of second pumping means 120.

Additionally, certain aspects of the invention may be practiced by the use of the first pumping means 30 without second pumping means 120, and either with or without filter means 100. Such an arrangement would provide precise, repeatable dispense of fluid, and could be used in applications involving less viscous fluids or fluids which do not require point-of-use filtration.

We claim:

1. In a device for dispensing an industrial fluid which is viscous and/or high purity and/or shear-sensitive, the combination of: first pumping means; and second pumping means adapted to receive said fluid after said fluid has been pumped by said first pumping means, said second pumping means including a diaphragm-type pump actuated by displacement of a relatively incompressible fluid, whereby said first pumping means draws said fluid from a reservoir and said second pumping means subsequently receives said fluid and said fluid is subsequently dispensed from said second pumping means; and means for dispensing said fluid from said second pumping means at intervals independent of operation of said first pumping means, said second pumping means being configured to selectively suck-back fluid after said fluid is downstream of said diaphragm.

2. In a device for dispensing industrial fluid which is viscous and/or high purity and/or shear-sensitive, the combination of: first pumping means; and second pumping means adapted to receive said fluid after said fluid has been pumped by said first pumping means, whereby said first pumping means is actuated by displacement of a relatively incompressible fluid, and said first pumping means draws said fluid from a reservoir and said second pumping means receives said fluid and said fluid is subsequently dispensed from said second pumping means; and means for dispensing said fluid from said second pumping means at rates independent of operation of said first pumping means, in which each of said first and second pumping means includes surfaces that contact said fluid, said surfaces being of materials that are non-contaminating to said fluid, said second pumping means being configured to selectively suck-back fluid from outlet tubing of said second pumping means.

3. In a device for dispensing industrial fluid which is viscous and/or high purity and/or shear-sensitive, the combination of: first pumping means; and second pumping means adapted to receive said fluid after said fluid has been pumped by said first pumping means, whereby said first pumping means is actuated by displacement of a relatively incompressible fluid, and said first pumping means draws said fluid from a reservoir and said second pumping means receives said fluid and said fluid is subsequently dispensed from said second pumping means; and means for dispensing said fluid from said second pumping means at rates independent of operation of said first pumping means, in which each of said first and second pumping means includes surfaces that contact said fluid, said surfaces being of materials that are non-contaminating to said fluid in which said first and second pumping means include diaphragm-type pumps.

4. In a device for dispensing an industrial fluid which is viscous and/or high purity and/or shear-sensitive, the combination of: first pumping means; and second pumping means adapted to receive said fluid after said fluid has been pumped by said first pumping means, said second pumping means including a diaphragm-type pump actuated by displacement of a relatively incompressible fluid, whereby said first pumping means includes means for creating negative pressure therein for drawing said fluid from a reservoir and said second pumping means subsequently receives said fluid and said fluid is subsequently dispensed from said second pumping means; and means for dispensing said fluid from said second pumping means at intervals independent of operation of said first pumping means.

5. In a device for dispensing an industrial fluid which is viscous and/or high purity and/or shear-sensitive, the combination of: first pumping means; and second pumping means adapted to receive said fluid after said fluid has been pumped by said first pumping means, said second pumping means including a diaphragm-type pump actuated by displacement of a relatively incompressible fluid, whereby said first pumping means draws said fluid from a reservoir and said second pumping means subsequently receives said fluid and said fluid is subsequently dispensed from said second pumping means; and means for dispensing said fluid from said second pumping means at intervals independent of operation of said first pumping means, in which incremental positive displacement of said second pumping means results in corresponding incremental dispense of said fluid.

6. In a device for dispensing an industrial fluid which is viscous and/or high purity and/or shear-sensitive, the combination of: first pumping means; and second pumping means adapted to receive said fluid after said fluid has been pumped by said first pumping means, said second pumping means including a diaphragm-type pump actuated by displacement of a relatively incompressible fluid, whereby said first pumping means draws said fluid from a reservoir and said fluid is subsequently dispensed from said second pumping means; and means for dispensing said fluid from said second pumping means at intervals independent of operation of said first pumping means and independent of rate of dispense from said second pumping means.

7. In a device for dispensing industrial fluid which is viscous and/or high purity and/or shear-sensitive, the combination of: first pumping means; and second pumping means adapted to receive said fluid after said fluid has been pumped by said first pumping means, whereby said first pumping means is actuated by displacement of a relatively incompressible fluid, and said first pumping means includes means for creating negative pressure therein for drawing said fluid from a reservoir and said second pumping means receives said fluid and said fluid is subsequently dispensed from said second pumping means; and means for dispensing said fluid from said second pumping means at rates independent of operation of said first pumping means, in which each of said first and second pumping means includes surfaces that contact said fluid, said surfaces being of materials that are non-contaminating to said fluid.

8. In a device for dispensing industrial fluid which is viscous and/or high purity and/or shear-sensitive, the combination of: first pumping means; and second pumping means adapted to receive said fluid after said fluid has been pumped by said first pumping means, whereby said first pumping means is actuated by displacement of a relatively incompressible fluid, and said first pumping means draws said fluid from a reservoir and said second pumping means receives said fluid and said fluid is subsequently dispensed from said second pumping means; and means for dispensing said fluid from said second pumping means at rates independent of operation of said first pumping means, in which incremental positive displacement of said second pumping means results in corresponding incremental dispense of said fluid, in which each of said first and second pumping means includes surfaces that contact said fluid, said surfaces being of materials that are non-contaminating to said fluid.

9. In a device for dispensing industrial fluid which is viscous and/or high purity and/or shear-sensitive, the combination of: first pumping means; and second pumping means adapted to receive said fluid after said fluid has been pumped by said first pumping means, whereby said first pumping means is actuated by displacement of a relatively incompressible fluid, and said first pumping means draws said fluid from a reservoir and said second pumping means receives said fluid and said fluid is subsequently dispensed from said second pumping means; and means for dispensing said fluid from said second pumping means at rates independent of operation of said first pumping means and independent of rate of dispense from said second pumping means, in which each of said first and second pumping means includes surfaces that contact said fluid, said surfaces being of materials that are non-contaminating to said fluid.

* * * * *